United States Patent [19]

Squire

[11] Patent Number: 4,510,429

[45] Date of Patent: Apr. 9, 1985

[54] STEPPER MOTOR DAMPING CIRCUIT AND A METHOD THEREFOR

[75] Inventor: John S. Squire, San Mateo, Calif.

[73] Assignee: Tulin Corporation, San Jose, Calif.

[21] Appl. No.: 524,837

[22] Filed: Aug. 19, 1983

[51] Int. Cl.³ .............................................. H02K 29/04
[52] U.S. Cl. ...................................... 318/696; 318/685
[58] Field of Search ................................ 318/696, 685

[56] References Cited

U.S. PATENT DOCUMENTS

| Re. 31,229 | 5/1983 | King ..................... 318/696 |
| 3,727,121 | 4/1973 | Rich ..................... 318/696 |
| 4,031,448 | 6/1977 | Adachi ................... 318/696 |
| 4,091,316 | 5/1978 | Friedman ................. 318/696 |
| 4,136,308 | 1/1979 | King ..................... 318/696 |
| 4,234,838 | 11/1980 | Langley et al. ........... 318/696 |
| 4,286,202 | 8/1981 | Clancy et al. ............ 318/696 |
| 4,319,174 | 3/1982 | Cook et al. .............. 318/696 |
| 4,329,635 | 5/1982 | Reilly ................... 318/696 |

*Primary Examiner*—Vit W. Miska
*Assistant Examiner*—Saul M. Bergmann
*Attorney, Agent, or Firm*—Limbach, Limbach & Sutton

[57] ABSTRACT

A control circuit for a stepper motor is disclosed. The stepper motor is driven by a chopper drive circuit. The frequency and the duty cycle of the stator or motor winding to which the chopper drive circuit has supplied the current is measured. The frequency and duty cycle measured are related to the back EMF induced in the driven stator. The back EMF is filtered and is used in a negative feedback manner and is supplied to the quadrature phase of the stepper motor to provide a damped step response.

19 Claims, 6 Drawing Figures

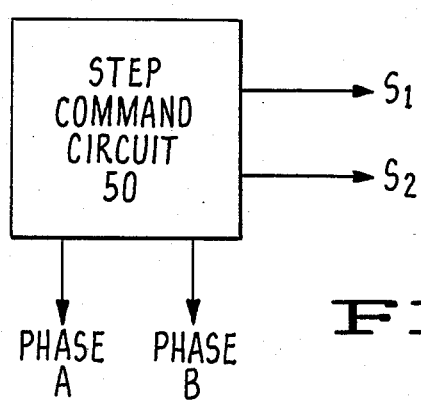
FIG._2.
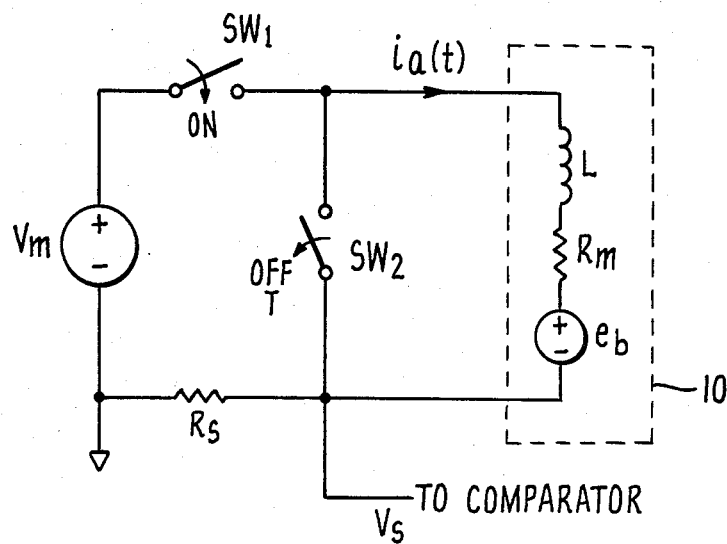
FIG._3.
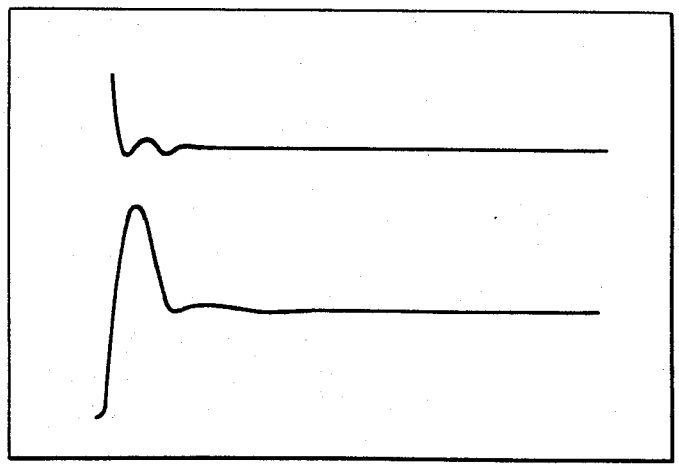
FIG._6.

STEPPER MOTOR DAMPING CIRCUIT AND A METHOD THEREFOR

DESCRIPTION

1. Technical Field

The present invention relates to a stepper motor damping circuit and a method for operating such a circuit and, more particularly, in one embodiment to a stepper motor circuit in which the drive circuit and the circuit for detecting the back EMF are in the same unit.

2. Background of the Invention

Stepper motors have been widely used for a variety of purposes. The advantage of a stepper motor is that it can receive digital signals and move digitally in response thereto. One application for a stepper motor is in actuating the head for a magnetic disc.

One of the problems with regard to the operation of a stepping motor at a high rate of speed is to stop the stepper motor as it arrives at a final position with little or no overshoot or oscillation of the rotor. When a stepper motor advances the final step, the rotor can oscillate about the detent position.

Various prior art methods have disclosed approaches to the problem of effectively damping a stepper motor to achieve a quick stop time. One method taught by the prior art is by mechanical friction. The use of an external mechanical damping device however adds to the size of the stepper motor and also limits the peak acceleration of the motor due to the added inertia of the damping device.

Another method is to damp the oscillation of the rotor by a control circuit. Typically, such a method involves the use of resistors and capacitors between the phases of a four-phase uni-polar drive circuit. U.S. Pat. No. 4,329,635 discloses an electrical apparatus for damping the rotational motion of a stepper motor using this technique.

Lastly, stepper motors have also been damped by the use of electronic damping. Typically, a sequence of phase switchings are applied to the stepper motor in a proper order at the critical times. This method is typically termed "backphase damping" or "delayed last step" damping. Although this method overcomes the limitations on slow speed and acceleration, the timing of the phase sequencing is critical. Moreover, the timing is motor and load dependent and can be very sensitive to parameter variations in the construction of the motor and in the load.

Finally, prior art also teaches using an electromagnetic tachometer which is coupled to the stepper motor shaft. The velocity information provided from the tachometer can be used in a feedback system to damp out the motor oscillation. This, too, adds weight to the stepper motor and ultimately limits the acceleration rate of the stepper motor.

U.S. Pat. No. 4,136,308 (U.S. Pat. No. Re 31,229) discloses a stepper motor control in which a transformer, separate from the winding of the coil of the motor, is used to sense the back EMF. The back EMF sensed by the transformer is used to commutate the power supplied to the coils of the stepper motor. The commutation signal is keyed to the rotor position so that the commutation signal is synchronized to provide an accurate indication of the angular position at which switching should occur in order to obtain maximum torque, regardless of the speed at which the motor is operating.

SUMMARY OF THE INVENTION

In the present invention, a method and an apparatus for use with the stepper motor of the type having a rotor and a first and a second stator is disclosed. The first and second motor windings or stators are positioned in quadrature phase, with the first winding being energized and switched and the second winding being energized and not switched when the motor is being advanced in the final step. The apparatus comprises means for sensing the voltage from the first winding. The back voltage from the first winding is determined from the sensed voltage by a determining means. The back voltage is then amplified by an amplifying means. Finally, the amplified back voltage is applied to the second winding to control the magnitude of the current to that winding.

BRIEF DESCRIPTION OF THE DRAWINGS

FIG. 2 is a block diagram of a component used with the apparatus of the present invention.

FIG. 3 is a schematic circuit diagram of a model of a component of the apparatus of the present invention.

FIG. 6 is a graph of the back EMF measured and the rotor position both as a function of time using the present invention.

DETAILED DESCRIPTION OF THE DRAWINGS

Figure 1:
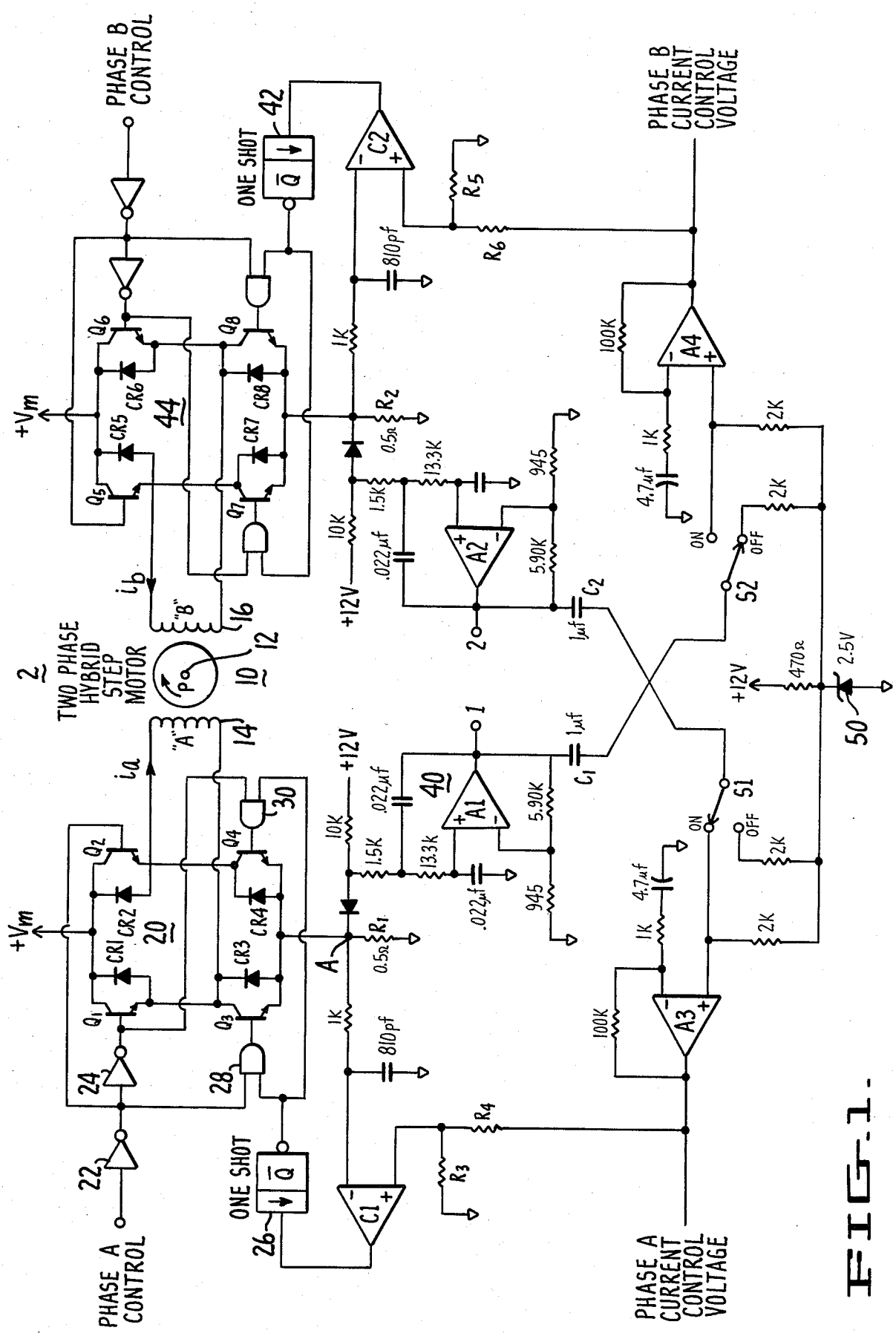
FIG. 1 is a schematic circuit diagram of the apparatus of the present invention.

Referring to FIG. 1, there is shown a schematic circuit diagram of an apparatus 2 of the present invention for use with a two-phase hybrid stepper motor 10. The stepper motor 10 comprises a rotor 12 and a first and a second stators 14 and 16, respectively. Each of the stators 14 and 16 is a coil winding to which current is applied to move the rotor 12 of the stepper motor 10. The first and second coil windings 14 and 16 are positioned in quadrature phase.

A first drive circuit 20 is connected to the first stator 14. The first drive circuit 20 provides drive current to the stator 14. The drive circuit 20 is a bipolar chopper current regulating drive circuit type and comprises four switching transistors: $Q_1$, $Q_2$, $Q_3$ and $Q_4$. The emitter of $Q_2$ is connected to the collector of $Q_4$ and the emitter of $Q_1$ is connected to the collector of $Q_3$. The emitter of $Q_2$ is also connected to one input of the first stator 14 with the collector of $Q_3$ connected to the other input of first stator 14. An input logic circuit comprising a first inverter 22 and a second inverter 24 selects which pair of the four transistors are to be turned on at a time. If the voltage at the terminal "Phase A Control" is high, then transistors $Q_2$ and $Q_3$ will be turned on. If the phase A control is low, then transistors $Q_1$ and $Q_4$ will be turned on. Thus, the voltage at phase A control determines the direction of current through the first stator 14. This type of bipolar chopper current regulating drive circuit 20 is well-known in the art.

The current through the first stator 14 is measured by a resistor $R_1$ at junction "A". The voltage measured at junction A is also supplied to a first comparator $C_1$. The comparator $C_1$ has two inputs: A first input from the junction "A", and a second input which is a reference voltage scaled by a divider network $R_3$ and $R_4$. The resistive divider network $R_3$ and $R_4$ sets a threshold voltage for the comparator $C_1$, which in turn controls the current through the first stator 14. From the comparator $C_1$, the result is passed to a first one-shot 26. The output of the one-shot 26 is then supplied to a first AND gate 28 and a second AND gate 30. The output of the first AND gate 28 is supplied to the base of transistor $Q_3$. The output of the second AND gate 30 is supplied to the base of transistor $Q_4$.

The voltage at junction "A" is also passed through a first filter 40. The filter 40 has an amplifier circuit $A_1$, which is a Sallen and Key filter with a cutoff frequency of about 2 KHz. The output of the filter 40 is supplied to a first blocking capacitor $C_1$.

From the first blocking capacitor $C_1$, the voltage is then passed through a switch, $S_2$, and is supplied to a second amplifier $A_4$. The amplifier $A_4$ amplifies the signal from the blocking capacitor $C_1$. The output of the amplifier $A_4$ is then supplied to the reference input of the second comparator $C_2$. The output of the second comparator $C_2$ is passed to a second one shot 42, which controls the second drive circuit 44.

The rest of the circuit for the control of the second stator 16 and for supplying the output from the second blocking capacitor $C_2$ to the reference input of the first comparator $C_1$ of the phase A control is identical to that which has been described heretofor.

The operation of the apparatus 2 of the present invention will now be discussed with regard to the first current drive control circuit 20 for the first stator 14. Since the second current drive control circuit 44 for the second stator 16 is identical to the first current drive control circuit 20 for the first stator 14, it will not be discussed.

In the operation of the apparatus 2 of the present invention, a voltage is supplied to the terminal marked "Phase A Control". If we assume that the voltage supplied to Phase A Control is high, then the voltage after the first inverter 22 will be low. This will turn off transistors $Q_2$ and $Q_3$, and turn on transistors $Q_1$ and $Q_4$. Current will flow through the first stator 14 in one direction. If the voltage supplied to Phase A Control is high, transistors $Q_1$ and $Q_4$ are enabled and current through the first stator 14 flows in a direction opposite to the one direction. Thus, the switching of the Phase A Control would bring about a change in the direction of the current flow through the first stator 14. Whenever there is a change in the direction of current flow through the first stator 14, due to the nature of the stepper motor 10, the rotor 12 is advanced one step. Once the appropriate pair of transistors are turned on, the voltage applied to the first stator 14 will have a frequency component and a duty cycle component.

The frequency component is caused in the following manner. The voltage detected at the junction "A" is sent to the first comparator $C_1$ which compares it to the reference voltage from the resistive network $R_3$ and $R_4$. When the voltage across the resistor $R_1$ or at junction "A" is greater than the reference voltage, then the comparator $C_1$ changes state and the first one-shot 26 is fired. This forces both transistors $Q_3$ and $Q_4$ to turn off. During this time, the current through the first stator 14 then flows across either diode $CR_1$ associated with transistor $Q_1$, or diode $CR_2$ associated with transistor $Q_2$. The current through the first stator 14 decays exponentially until the time period for the one-shot 26 expires. The appropriate transistor, either $Q_3$ or $Q_4$, is then turned back on and the current through the first stator 14 increases until the voltage at junction "A" begins to exceed the reference voltage as determined by the comparator $C_1$. The entire process repeats itself then.

The drive circuit 20 will thus oscillate by itself which would produce an average current through the first stator 14. The frequency of the oscillation will mainly depend upon the time period of the one-shot 26 and the circuit parameters which govern the current rising back to the threshold of the first comparator $C_1$.

The average current flowing through the first stator 14 is determined in part by the reference voltage supplied to the input of the first comparator $C_1$. If the reference voltage supplied to the first comparator $C_1$ is high, then the average will also be high. If the reference voltage supplied to the first comparator $C_1$ is low, then the duty cycle of the current through the first stator 14 will also be low.

The present invention is, in part, the discovery that the voltage applied to the stator coil 14 or 16 will have a frequency and a duty cycle which is related to the back EMF generated by that stator coil 14 or 16.

The voltage measured at the junction "A" will have a frequency and a duty cycle which follow the frequency and the duty cycle of the voltage across the first stator 14. This voltage is the total voltage comprising, in part, the drive voltage from the drive circuit 20 as well as the back EMF voltage generated by the first stator 14. From the junction "A", the total sensed voltage is then passed through a filter 40. The filter 40 passes only the low frequency component of the total voltage therethrough. Since the drive frequency is on the order of 25 KHz, i.e., the one-shot 26 operates in the 25 KHz range, the filter 40 passes the low frequency components of the sensed voltage through. The first amplifier $A_1$ passes frequencies below approximately 2 KHz. Thus, it has a high frequency cutoff of about 3 KHz. The low frequency component of the total voltage will be primarily the back EMF voltage.

From the first filter 40, the filtered voltage is supplied to a first blocking capacitor $C_1$. The blocking capacitor $C_1$ is chosen to allow variation in duty cycle above approximately 60 Hz to pass and to block all frequencies below 60 Hz. Thus, only variations in the duty cycle, which are caused by the induced or the back EMF in the motor phases 14 or 16 and block variations in operating point for the drive circuits are passed through the blocking capacitor $C_1$.

From the first blocking capacitor $C_1$, the signal is supplied to a switch $S_2$. The switch $S_2$ permits the disabling of the feedback circuit when the motor is slewing or accelerating. If the switch $S_2$ is turned on, the signal from the first blocking capacitor $C_1$ is passed through a resistive network comprising two 2K resistors and is supplied to the positive input of the amplifier $A_4$. The combination of the first blocking capacitor $C_1$ and the two 2K resistors provides an AC coupling to ensure that the measurement which is fed back will be independent of the power supply variations or desired current levels in the motor phases. The signal which is amplified from the amplifier $A_4$ is then supplied as the reference voltage for the second comparator $C_2$ for the drive circuit $A_4$ for the second stator 16.

If the switch $S_1$ or $S_2$ is in the off position, the signal from the blocking capacitor $C_1$ or $C_2$ is shunted to the zener diode 50.

The apparatus 2 of the present invention is used primarily to brake the stepper motor 10 as the rotor 12 approaches the final position through a final step. When the rotor 12 is being advanced in the final step, and if the phase switch which accomplishes the final step movement occurs at the Phase A Control terminal, then during this time, no phase switch occurs in the second stator 16. Switch $S_2$ is turned on to permit the back EMF as detected at junction "A" and as filtered through the first filter 40 to be passed in a feedback manner through the amplifier $A_4$ and supplied to the second comparator $C_2$. The back EMF from the first stator 14 is used to control the current supplied to the second stator 16. The current is supplied to the second stator 16 through its drive circuit 44 to control the stator 16 so that it acts as a brake on the motion of the rotor 12. The current supplied to the second stator 16 is proportional to the back EMF and a constant bias from the zener diode 50 supplied at the reference input of comparator $C_2$. The constant bias portion of the voltage supplied at the reference input of the comparator $C_2$ maintains a nominal current through the second stator 16 at all times. The variation in the reference input of the comparator $C_2$ from the back EMF varies the total voltage bias to the reference input of the comparator $C_2$.

The stepper motor 10 is typically advanced through a plurality of steps from a first position to a second position. A block diagram of a step command circuit 50 is shown in FIG. 2. The step command circuit 50, which is well known in the art (see U.S. Pat. No. 4,329,635) determines how far the stepper motor 10 is away from the final desired position. From the step command circuit 50, the voltages are supplied to the terminals labelled "Phase A Control" and "Phase B Control". When the stepper motor 10 is one step away from the final position, only "Phase A Control or "Phase B Control" is switched. The appropriate switch $S_1$ or $S_2$ is connected, activating the feedback circuit. This then provides the control for the present invention.

The theory of the present invention may be understood as follows. A simplified model of the schematic circuit diagram of one drive circuit 20 or 44 of the apparatus 2 of the present invention is shown in FIG. 3. A switch $SW_1$ supplies the power from a voltage source $V_m$ to the stepper motor 10 shown as having an inductance L, a resistance $R_m$ and a back EMF $e_b$. The stepper motor 10 is shown in the dotted line. As shown in FIG. 3, the first switch $SW_1$ provides the frequency for the voltage supplied to the stepper motor 10. A second switch $SW_2$ which is switched on and off periodically provides the duty cycle of the circuit.

The current $i_a(t)$ may be found as a function of time by solving two differential equations. Once the appropriate initial conditions are known, the equations relate the coil current under the conditions when $SW_1$ is closed and $SW_2$ is opened, representing the circuit action when the coil current is increasing. With $SW_2$ open and $SW_1$ closed this represents the coil current decreasing.

$$\frac{di}{dt}a = \frac{-R_m}{L}i_a + \frac{V_m - e_b}{L} \quad (SW_1 \text{ closed}) \quad (1)$$

-continued $$\frac{di}{dt}a = \frac{-R_m}{L}i_a - \frac{e_b}{L} \quad (SW_2 \text{ closed}) \quad (2)$$

In both equations, it is assumed that $R_1 << R_m$ so this term is neglected.

First solving equation 2 under the initial condition $i_a(0^+) = I_{TH}$;

$$i_a(t) = \frac{-e_b}{R_m}(1 - e^{-t/\tau}) + I_{TH}e^{-t/\tau}; \quad \tau = \frac{L}{R_m}$$

This equation is only valid while the one shot is fired and the lower drive transistors are turned off. Assuming the back EMF is constant during the one shot firing period, T, the final current in the coil when $SW_2$ is opened and $SW_1$ is closed will be $$i_a(T) = \frac{-e_b}{R_m}(1 - e^{-T/\tau}) + I_{TH}e^{-T/\tau} \triangleq I_O \quad (3)$$

It is apparent that the current of equation 3 is the initial condition for the coil current when $SW_1$ is closed. So the equation describing the current during this period will be $$i_a(t) = \frac{V_m - e_b}{R_m}(1 - e^{-t/\tau}) + I_O e^{-t/\tau} \quad (4)$$

Note that the initial condition for equation 4 is the final current that was found in equation 3. From equation 4, it is possible to solve for the other half of the drive oscillation period $t_{on}$ by letting $i_a(t) = I_{TH}$ and solving for t. Equation 5 gives the solution for $t_{on}$ under this condition.

$$t_{on} = -\tau \ln \frac{\frac{I_{TH} - 1}{A}}{\frac{I_O}{A} - 1} \quad \text{where } A \triangleq \left(\frac{V_m - e_b}{R_m}\right) \quad (5)$$

Thus, the frequency of drive oscillation is given by $$f = \frac{1}{T + t_{on}} \quad (6)$$

and the duty cycle is given by $$\text{Duty Cycle} = \frac{t_{on}}{T + t_{on}} \quad (7)$$

Because the $t_{on}$ is a function of the back EMF, $e_b$, either the oscillator frequency or the duty cycle can be measured to observe slow variations in the induced back EMF in one of the coil phases.

Figure 4:
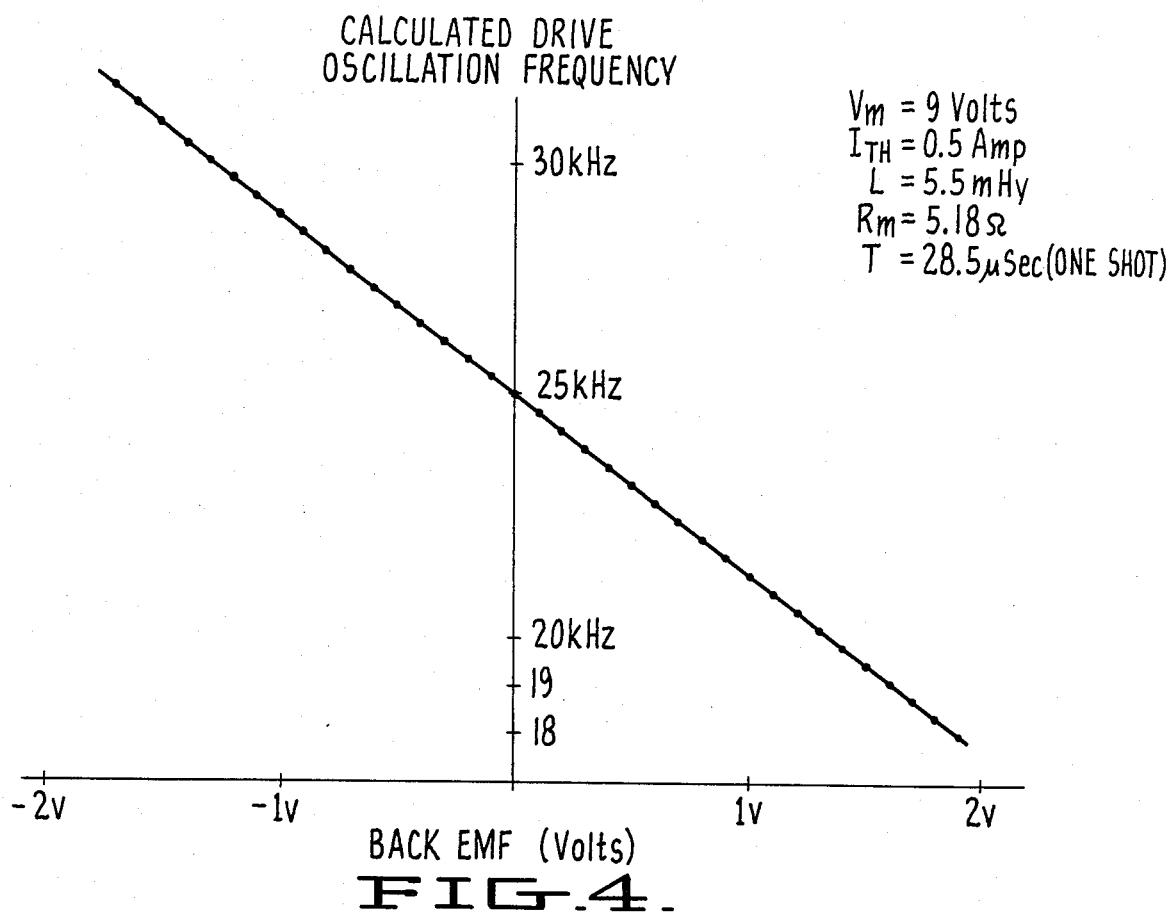
FIG. 4 is a graph of the drive oscillation frequency as a function of the back EMF for a calculated set of parameters for a stepper motor.

FIG. 4 is a graph of the back EMF as a function of the drive oscillation frequency calculated based upon equations 2, 5, 6 and 7 for a stepper motor with 5.5 mh inductance, 5.18 Ω phase resistance, and with 9 volts applied to the motor. The time period for the one shot is assumed to be approximately 28.5 microsec.

Figure 5:
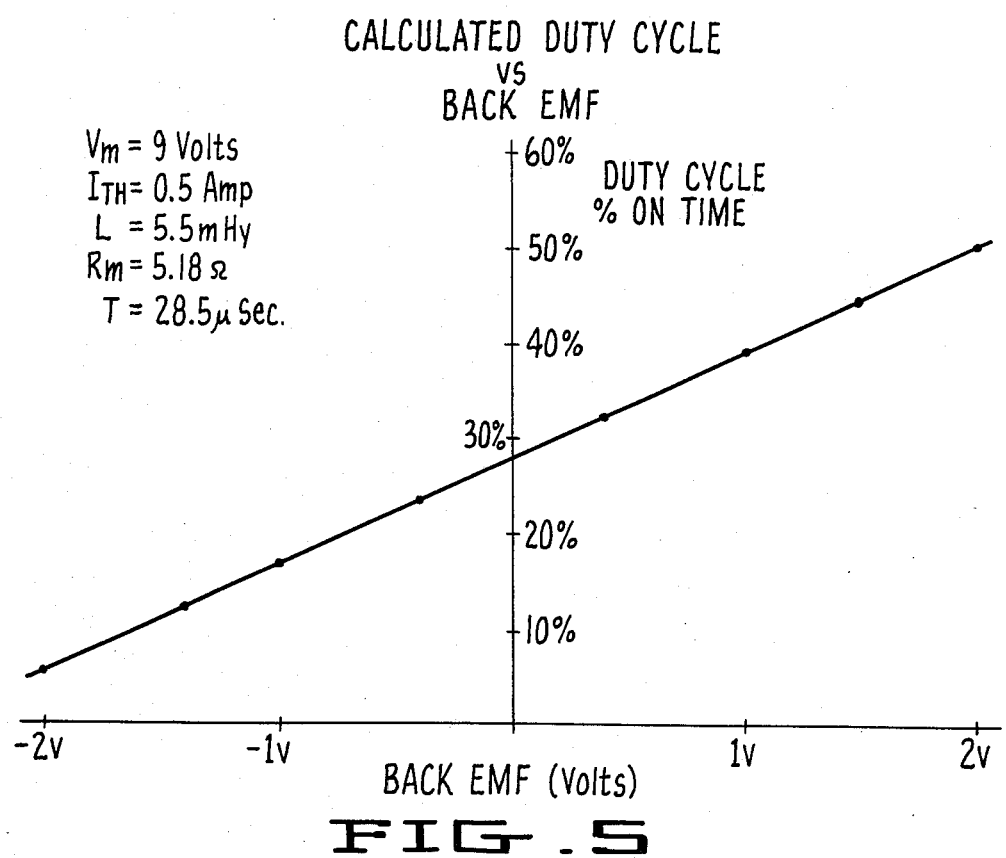
FIG. 5 is a graph of the duty cycle as a function of the back EMF for a calculated set of parameters for a stepper motor.

FIG. 5 is a graph of the drive oscillation frequency and the duty cycle as a function of the back EMF based upon the same calculations using the same assumptions.

As can be seen from FIGS. 4 and 5, the back EMF is very nearly a linear function of the oscillation frequency as well as the duty cycle.

Referring to FIG. 6, there is shown a plot of the sensed back EMF as a function of time corresponding to the rotor position as a function of time with a stepper motor using the present invention. As can be seen from FIG. 6, the rotor quickly settles to a stable position with the present invention.

As previously stated, the present invention is the measurement of either the duty cycle or the frequency of the current through a stator to measure the back EMF induced in that stator. The signal derived from the measurement is then used to control the current in the opposite phase of the stepper motor in order to provide a damped step response. In the embodiment shown in FIG. 1, the duty cycle of the voltage across the stator to which a current has been applied is measured. The variation of the duty cycle caused by the back EMF is then used to control the current in the quadrature phase of the stepper motor. Since the frequency of the oscillation is also dependent upon the back EMF, an alternate embodiment would be to detect the frequency and converting it to a voltage, using well-known frequency-to-voltage conversion techniques. The variation in the frequency could then be used to control the current in the quadrature phase of the stepper motor. In addition, the measurement of the back EMF can be made from other sources, such as at the comparator $C_1$ or $C_2$ or at the output of the first or second one shot.

What is claimed is:

1. A method of damping a stepper motor having a rotor and a first and a second stator, said method comprising the steps of:
   applying a first voltage to said first stator;
   detecting the total voltage from said first stator;
   filtering the back voltage generated by said motor from said total voltage and
   applying a drive current to said second stator to damp said motor, said drive current being proportional to said back voltage.

2. The method of claim 1 further comprising the step of:
   applying said drive current to said second stator when said motor is being moved in the final step.

3. The method of claim 2 wherein said first voltage has a frequency and a duty cycle, said frequency and duty cycle of said first voltage being proportional to the back voltage generated from said motor.

4. The method of claim 3 further comprising the step of amplifying said filtered back voltage and generating said drive current proportional to said amplified back voltage.

5. A method of operating a stepper motor, having a rotor and a first and a second stator, in moving said rotor from a first position to a second position through a plurality of steps, comprising the steps of:
   determining when said rotor is one step away from said second position;
   applying a first voltage to said first stator to move said rotor to said second position;
   detecting the back voltage generated by said motor from said first stator; and
   applying a drive current to said second stator in quadrature phase to said first voltage being applied to said first stator, said drive current being proportional to said back voltage being applied during said one step.

6. The method of claim 5 further comprising the step of amplifying said back current and generating said drive energy proportional to said amplified back current.

7. A method for damping the rotational motion of a stepper motor of the type having a first and a second motor winding positioned in quadrature phase, said first winding being energized and switched and said second winding being energized and not switched when said motor is being advanced in the final step, said method comprising the steps of:
   sensing the voltage from said first winding;
   isolating the back voltage from said first winding from the sensed voltage;
   amplifying said isolated back voltage; and
   applying said amplified back voltage to said second winding.

8. An apparatus for use with a stepper motor of the type having a rotor and a first and a second stator, said apparatus comprising:
   means for applying a drive voltage to said first stator;
   means for sensing the total voltage from said first stator;
   means for filtering the back voltage generated by said motor in said first stator from said total voltage; and
   means for applying a drive current to said second stator in quadrature phase to said drive voltage being applied to said first stator, said drive current being proportional to said filtered back voltage.

9. The apparatus of claim 8 wherein said means for applying a drive voltage is a bipolar chopping current driver.

10. The apparatus of claim 8 wherein said sensing means is a resistor positioned to detect the total voltage from said first stator.

11. The apparatus of claim 8 wherein said filtering means is a filter with a high frequency cut-off of approximately 2 KHz, and a low frequency cut-off of approximately 60 Hz.

12. The apparatus of claim 8 wherein said means for applying a drive current is also a bipolar chopping current driver.

13. The apparatus of claim 8 further comprising: means for amplifying said back voltage.

14. An apparatus for use with a stepper motor of the type having a rotor and a first and a second stator, for moving said rotor from a first position to a second position through a plurality of steps, said apparatus comprising:
   means for determining when said rotor is one step from said second position;
   means for applying a drive voltage to said first stator;
   means for sensing the back voltage generated by said motor from said first stator; and
   means for applying a drive current to said second stator in quadrature phase to said drive voltage being applied to said first stator, said drive current having a constant bias part and a part proportional to said back voltage.

15. The apparatus of claim 14 wherein said means for applying a drive voltage is a bipolar chopping current driver.

16. The apparatus of claim 14 wherein said sensing means is a resistor positioned to detect the drive voltage whose duty cycle is proportional to said back voltage and a filter to filter the back voltage from said duty cycle.

17. The apparatus of claim 14 wherein said means for applying a drive current is also a bipolar chopping current driver.

18. The apparatus of claim 14 further comprising: means for amplifying the back voltage sensed.

19. An apparatus for damping the rotational motion of a stepper motor of the type having a first and a second motor winding mounted in quadrature phase, said first winding being energized and switched and said second winding being energized and not switched, when said motor is being advanced in the final step, said apparatus comprising:
  means for sensing the voltage from said first winding;
  means for isolating the back voltage from said first winding from the sensed voltage
  means for amplifying said isolated back voltage; and
  means for applying said amplified back voltage to said second winding.

* * * * *